United States Patent [19]
Hirokawa et al.

[11] Patent Number: 6,012,637
[45] Date of Patent: Jan. 11, 2000

[54] CARD SYSTEM FOR COLLECTIVELY LOADING RIGHT OF USE IN PREDETERMINED AMOUNT OF MONEY AND METHOD OF PROCESSING THE CARD

[75] Inventors: Katsuhisa Hirokawa, Yokosuka; Seizo Motai, Chiba; Youko Tanaka, Tokyo, all of Japan

[73] Assignee: Kabushiki Kaisha Toshiba, Tokyo, Japan

[21] Appl. No.: 08/910,226

[22] Filed: Aug. 13, 1997

[30] Foreign Application Priority Data

Aug. 14, 1996 [JP] Japan .................................. 8-214747

[51] Int. Cl.$^7$ ...................................................... G06K 5/00
[52] U.S. Cl. .......................... 235/380; 235/492; 235/375; 705/44; 902/26
[58] Field of Search ..................................... 235/380, 376, 235/379, 382, 375, 492; 705/16, 35, 42, 43, 44; 902/26

[56] References Cited

U.S. PATENT DOCUMENTS

| | | | |
|---|---|---|---|
| 5,177,342 | 1/1993 | Adams | 235/379 |
| 5,454,414 | 10/1995 | Benton | 235/379 |
| 5,521,362 | 5/1996 | Powers | 235/380 |
| 5,644,118 | 7/1997 | Hayashida | 235/379 |
| 5,793,027 | 8/1998 | Baik | 235/380 |
| 5,811,771 | 9/1998 | Dethloff | 235/380 |

*Primary Examiner*—Michael G Lee
*Assistant Examiner*—Diane I. Lee
*Attorney, Agent, or Firm*—Pillsbury Madison & Sutro LLP

[57] ABSTRACT

A card transaction system and method which includes the card medium, an accepting apparatus for the card medium, and a host computer of a card medium issuer connected to the accepting apparatus via a communication line, comprises, an approving function for causing the host computer to answer one credit inquiry from the issuer so that the host computer approves right of use for the card medium within a predetermined amount of money without a necessity of performing a credit inquiry, a supply function for causing the accepting apparatus to supply information of the right of use to the card medium when the approving function approves the right of use, and a function for causing information of the right of use to be stored in a storage region of the card medium so as to realize a plurality of transactions with the card medium within the predetermined range of the amount of money without the necessity of performing the credit inquiry.

18 Claims, 9 Drawing Sheets

FIG. 1

(a) STAGE 1: LOAD AUTHORIZED VALIE TO LOAD CARD 1b (b) STAGE 2: LOAD AUTHORIZED VALIE TO LOAD CARD 1b (c) STAGE 3: DATA TRANSMISSION TO CARD ISSUING COMPANY

| | |
|---|---|
| IC CARD (AUTHORIZED VALUE CARD 1a) | ACCOUNT ID<br>LOAD ID (1~n)<br>LIMITATION AMOUNT OF AUTHORIZED VALUE<br>POSSIBILITY VALIDITY TERM OF CARD<br>AUTHORIZED VALUE LOAD FORM<br>PIN<br>ENCRYPT/DECRYPT KEY |
| IC CARD (LOADED CARD) | LOAD ID<br>AUTHORIZED VALUE REMAINDER<br>LIMITATION AMOUNT OF RECEIVING AUTHORIZED VALUE<br>CARD EXPIRATION DATE<br>ISSUED AUTHORIZED VALUE ORDER NUMBER<br>ENCRYPT/DECRYPT KEY |
| LOADED CAD 2 | TERMINAL ID<br>ENCRYPT/DECRYPT KEY |
| TRANSACTION CAD 2 | TERMINAL ID<br>ISSUED TRANSACTION ID<br>ENCRYPT/DECRYPT KEY |
| ACCESS POINT 4 | RECEIVED TRANSACTION ID<br>ENCRYPT/DECRYPT KEY |
| HOST COMPUTER 3 OF CARD ISSUING COMPANY | LOAD CARD ID FOR AUTHORIZED VALUE CARD (1~PLURAL)<br>LIMITATION AMOUNT OF AUTHORIZED VALUE UTILIZATION FOR AUTHORIZED VALUE CARD HOLDER<br>VALIDITY TERM<br>CONSUMED LOAD AUTHORIZED VALUE AMOUNT<br>ENCRYPT/DECRYPT KEY<br>PARAMETER FOR ISSUING RANDOM NUMBER |

FIG. 7

CARD SYSTEM FOR COLLECTIVELY LOADING RIGHT OF USE IN PREDETERMINED AMOUNT OF MONEY AND METHOD OF PROCESSING THE CARD

BACKGROUND OF THE INVENTION

The present invention relates to a card transaction system and method arranged such that an authorized value is previously given to a card so that a credit inquiry at each transaction is omitted.

Hitherto, the seller must make a credit inquiry to a card issuing company whenever a transaction is performed using a credit card or the like in order to confirm whether or not the transaction may be performed. Since a credit inquiry creates a cost, a method has been employed in which when a transaction amount is below a specified value, the transaction can be performed without credit inquiry. However, the specified value is usually judged to be one yen or larger (called a "zero floor limit") in order to prevent unlawful use. The credit inquiry has been performed in substantially all transactions under these circumstances.

However, the credit inquiry incurs costs including communication costs with the card issuing company and costs relating to determining the card user's credit standing. Therefore, a transaction involving a small amount of money may not bring the seller a profit. On the other hand, if the credit inquiry is not performed, unlawful use of the card may result. Thus, there arises an opportunity to provide a way to make credit inquiries at a low cost while improving security by minimizing the risk of limitless damage for the seller.

BRIEF SUMMARY OF THE INVENTION

An object of the present invention is to provide a card transaction system and a card transaction method capable of minimizing the cost required to perform credit inquiry and improving the security.

According to one aspect of the present invention, there is provided a card medium system which includes the card medium, an accepting apparatus for the card medium, and a host computer of a card medium issuer connected to the accepting apparatus via a communication line, comprising: approving means for causing the host computer to answer one credit inquiry from the issuer so that the host computer approves right of use for the card medium within a predetermined amount of money without a necessity of performing a credit inquiry; supply means for causing the accepting apparatus to supply information of the right of use to the card medium when the approving means approves the right of use; and storage means for causing information of the right of use to be stored in a storage area of the card medium so as to realize a plurality of transactions with the card medium within the predetermined range of the amount of money without the necessity of performing the credit inquiry.

The present invention having the above-mentioned structure enables a card to be used plural times within a predetermined amount of money after a single credit inquiry has been performed as compared with the conventional structure with which credit inquiry is made with respect to the host computer whenever transaction is performed.

That is, if an authorized value of 1,000 dollars is given to a card, use of the card in an amount of money of 10 dollars can smoothly and quickly be performed 100 times without a necessity of performing the credit inquiry. Therefore, the problem experienced with the conventional structure is that the credit inquiry must be performed by using a communication line whenever the card is used even if the amount is very small and thus the communication cost causes the transaction to be unprofitable for the authorized value company.

Also a card medium processing method of a card medium system according to the present invention is able to smoothly, quickly and efficiently load authorized value to a card because of the same reason.

Additional objectives and advantages of the invention will be set forth in the description which follows, and in part will be obvious from the description, or may be learned by practice of the invention. The objectives and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described.

Figure 1:
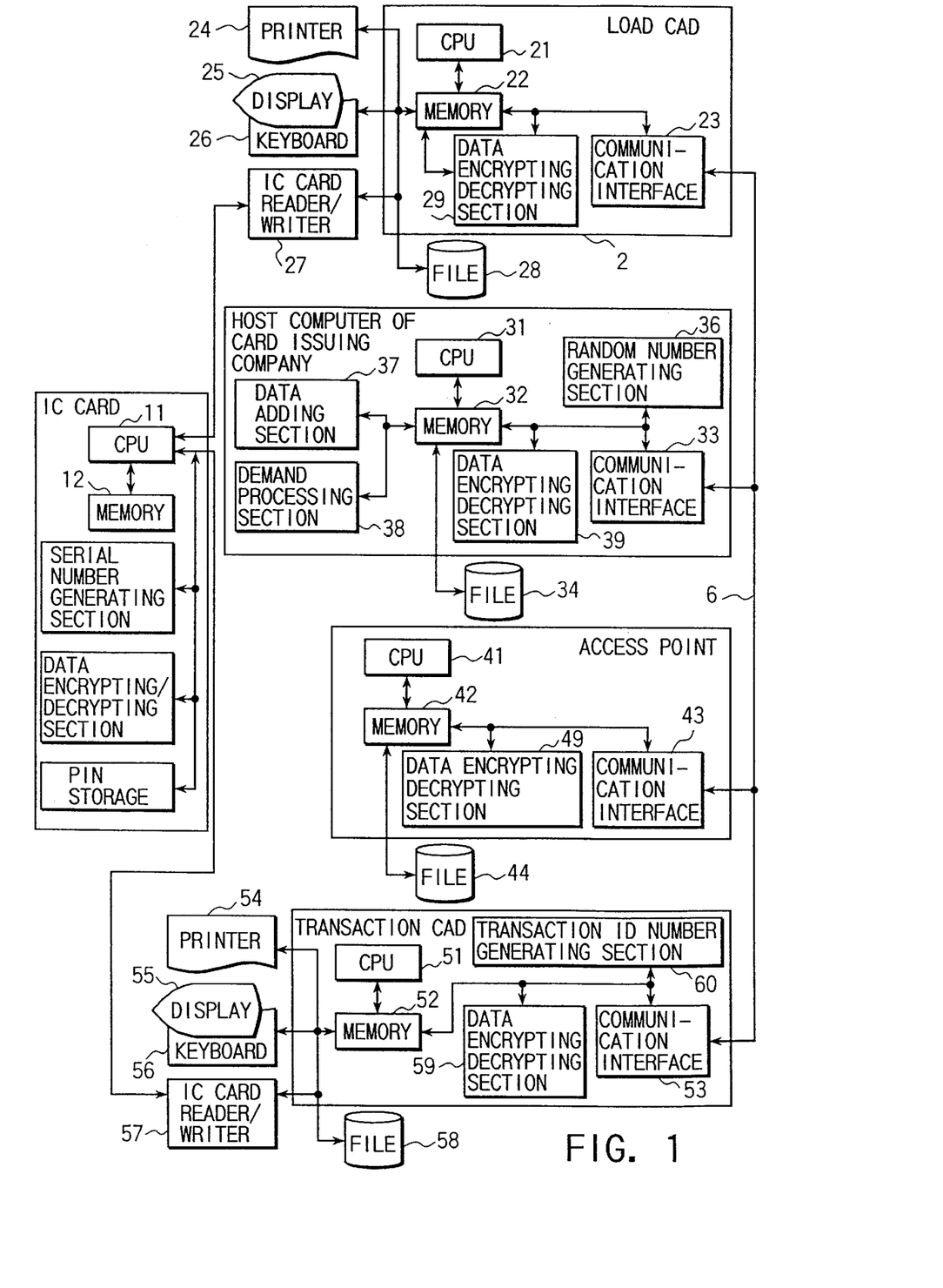
FIG. 1 is a block diagram showing the schematic structure of a card transaction system according to the present invention.

FIG. 1 shows the schematic structure of a card transaction system according to the present invention. That is, a card transaction system comprises IC cards 1 issued by a card issuing company, load CADs (Card Acceptance Devices) 2 for loading authorized value, a host computer 3 of the card issuing company, access points 4 and transaction CADs 5 used at shops for performing transactions and, through communication lines 6, connected to the load CADs 2, the host computer 3 and the access points 4.

The IC cards 1 are classified into authorized value cards 1a (not shown) having an authorized value function capable of instructing load of authorized value, loaded cards 1b for loading the authorized value to enable transaction to be performed thanks to the loaded authorized value and IC cards 1c each of which is formed by combining the functions of the authorized value card and the loaded card.

Since the above-mentioned IC cards 1, 1a, 1b and 1c have the same structure, the structure of the IC card 1 shown in FIG. 1 will now be described. That is, the IC card 1 comprises a CPU 11, a memory 12, a serial number generating section 13, a data encrypting/decrypting section 14 and a PIN storage 15.

The CPU 11 supplies/receives data and commands to and from an IC card reader/writer 27 or 57 to be described later and checks the PIN (Personal Identification Number) existing in a PIN storage 15. In the memory 12 serving as a storage means, there are recorded data items required to perform the process. The serial number generating section 13 issues a unique serial number which is given to an authorized value which is paid when transaction is performed by using the loaded authorized value. The issued serial number is, together with the authorized value, supplied to the seller so as to be used when the authorized value is duplicate-checked.

The data encrypting/decrypting section 14 encrypts data which is transmitted to the load CAD 2 or the transaction CAD 5 and decrypts encrypted data supplied from the load CAD 2 or the transaction CAD 5. Moreover, the data encrypting/decrypting section 14 calculates certification data in accordance with a random number informed from the host computer 3 of the card issuing company.

The load CAD 2 is a CAD (Card Acceptance Device) which receives an instruction to load the authorized value and communicates with the host computer 3 of the card issuing company so as to load the authorized value to a predetermined IC card 1 after the host computer 3 of the card issuing company has approved the authorized value. The load CAD 2 comprises a CPU 21, a memory 22, a communication interface 23, a printer 24, a display unit 25, a keyboard 26, an IC card reader/writer 27, a file 28 and a data encrypting/decrypting section 29.

The CPU 21 controls the respective devices to instruct to transmit/receive data to and from the IC card 1, check data and write data on the IC card 1. In the memory 22, there are written various data items. The communication interface 23 transmits/receives data to and from the host computer 3 of the card issuing company, the data items being developed in the memory 22.

The printer 24 issues a certificate when the load has been completed. The display unit 25 displays messages or data required for the authorized value load process. The keyboard 26 receives input of the PIN and load destination and provides same data to the memory 22. The IC card reader/writer 27 reads data on the IC card 1 and writes data on the IC card 1.

Software and data required for the load process are stored in the file 28. The data encrypting/decrypting section 29 encrypts data, which is transmitted to the IC card 1 or the host computer 3 of the card issuing company, and decrypts a portion of encrypted data transmitted from the IC card 1 or the host computer 3 of the card issuing company.

The host computer 3 of the card issuing company approves the transaction in accordance with the state of the authorized value of the owner (a cardholder) of the issued IC card 1. The host computer 3 of the card issuing company receives data about the transaction to make a demand that the owner of the IC card 1 (the cardholder) should pay later. Moreover, the host computer 3 of the card issuing company pays the transaction amount to each shop. The host computer 3 of the card issuing company comprises a CPU 31, a memory 32, a communication interface 33, a file 34, a data encrypting/decrypting section 35, a random number generating section 36, a data totalization section 37 and a demand processing section 38.

The CPU 31 controls the respective units. A variety of data items are recorded in the memory 32. The communication interface 33 transmits/receives data to and from the load CAD 2 and the access point 4, the data item being developed in the memory 32. In the file 34, there are stored software and various data items required to load the authorized value, add transaction data items and make the demand.

The data encrypting/decrypting section 35 encrypts data, which is transmitted to the load CAD 2 or the access point 4, and decrypts encrypted data transmitted from the load CAD 2 or the access point 4. Moreover, the data encrypting/decrypting section 35 calculates a certificate data in accordance with the random number issued from the random number generating section 36. The random number generating section 36 issues a random number for certifying whether or not the IC card 1 is a card to which is the authorized value may be loaded. The random number is informed to the IC card 1. The IC card 1 calculates a certification data in accordance with the random number, and then informs the host computer 3 of the card issuing company of a result of the calculation.

The data totalization section 37 totalizes transaction data transmitted from the access point 4 for each IC card 1. The added data items are used to check whether or not the amount of the transacted authorized value exceeds the previously loaded authorized value. The demand processing section 38 makes a demand with respect to the owner of the IC card 1 (the cardholder) in accordance with transaction data.

The access point 4 receives data from a plurality of transaction CADs 5, and then assigns data to predetermined host computers 3 of the card issuing companies. The access point 4 comprises a CPU 41, a memory 42, a communication interface 43, a file 44 and a data encrypting/decrypting section 45. The CPU 41 controls the each units. In the memory 42, there are recorded a variety of data items. The communication interface 43 transmits/receives data to and from the host computer 3 of the card issuing company and the transaction CAD 5, the data item being developed in the memory 42. In the file 44, there are stored software and data required to assign data. The data encrypting/decrypting section 45 decrypts a portion of encrypted data which is transmitted from the transaction CAD 5 to the host computer 3 of the card issuing company or from the host computer 3 of the card issuing company to the transaction CAD 5.

The transaction CAD 5 is a CAD (a Card Acceptance Device) which receives the authorized value supplied from the IC card 1 when transaction is performed and transmits transaction data to the access point 4 at predetermined time. The transaction CAD 5 comprises a CPU 51, a memory 52, a communication interface 53, a printer 54, a display unit 55, a keyboard 56, an IC card reader/writer 57, a file 58, a data encrypting/decrypting section 59 and a transaction ID number generating section 60.

The CPU 51 controls the above-mentioned units to instruct transmitting/receiving data to and from the IC card 1, checking of data and writing of data on the IC card 1. In the memory 52, there are recorded a variety of data items. The communication interface 53 transmits/receives the data items to and from the host computer 3 of the card issuing company, the data item being developed in the memory 52. The printer 54 issues a certificate when the transaction has been completed.

The display unit 55 displays messages or data required to perform the transaction process. The keyboard 56 receives input of an authorized value amount if the authorized value is in short so as to transmit data to the memory 52. The IC card reader/writer 57 reads data in the IC card 1 or writes data on the IC card 1. In the file 58, there are stored software and data required to perform the transaction process.

The data encrypting/decrypting section 59 encrypts data, which is transmitted to the IC card 1 or the host computer 3 of the card issuing company, and decrypts a portion of encrypted data which is transmitted from the IC card 1 or the host computer 3 of the card issuing company. The transaction ID number generating section 60 generates the transaction ID number when transaction data is generated. The transaction ID is uniquely given to transaction data so as to be used in duplicate-check of transaction data.

Figure 2:
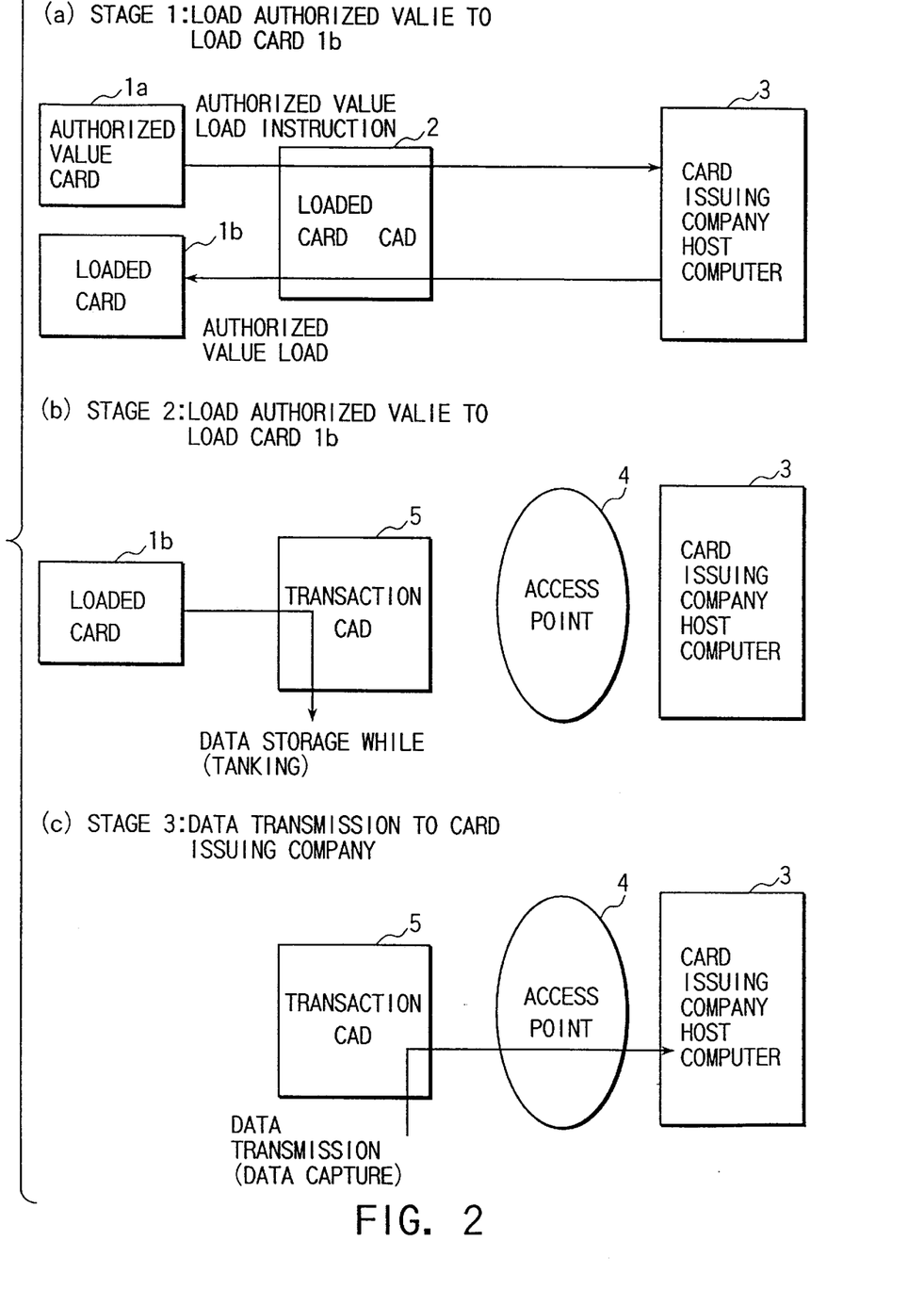
FIG. 2 is a diagram showing a schematic flow of data in each process.

FIG. 2 shows a schematic flow of data among the IC card 1 (the authorized value card 1a and the loaded card 1b), the load CAD 2, the transaction CAD 5, the host computer 3 of the card issuing company and the access point 4 in each process.

Figure 3A:
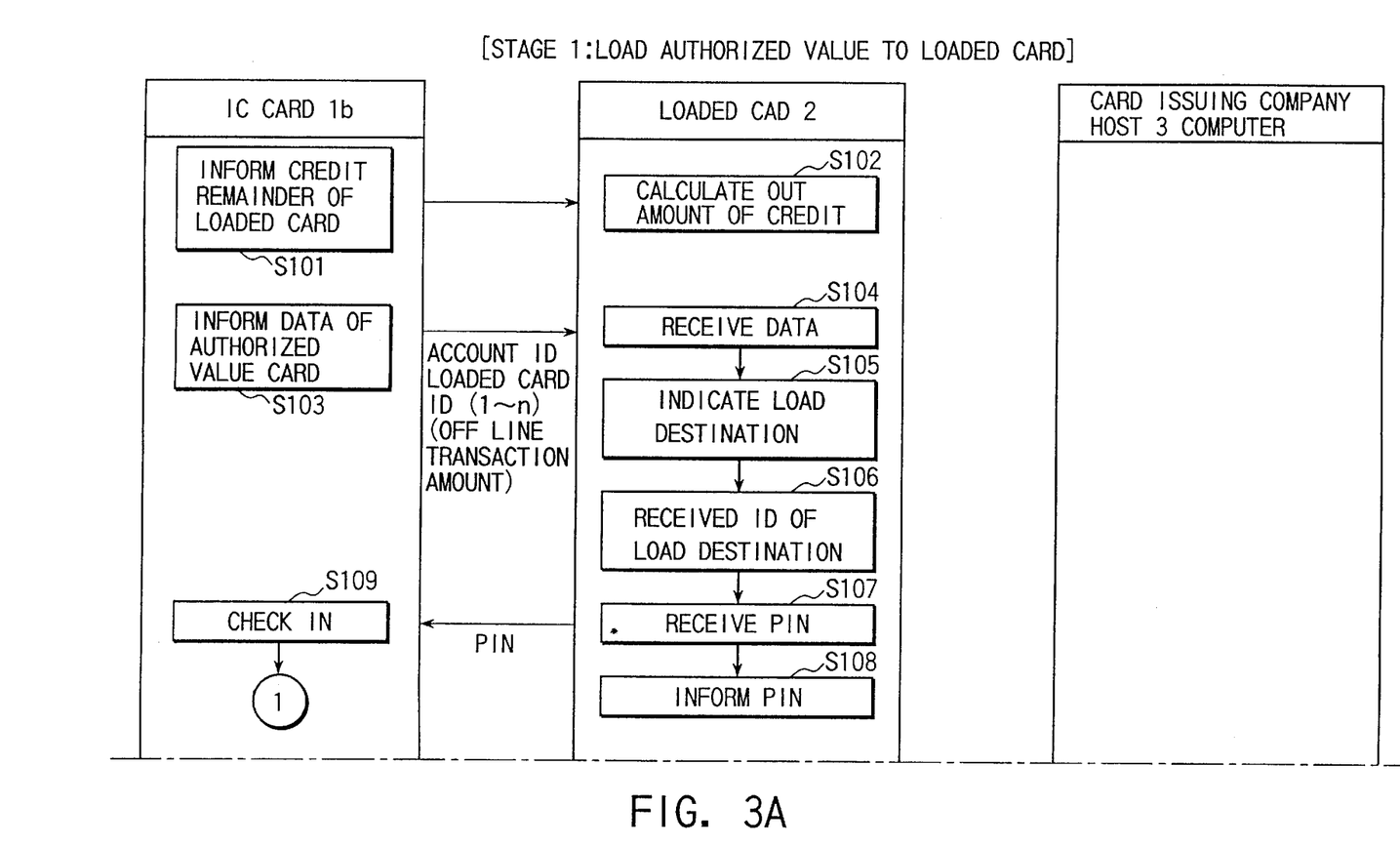
FIGS. 3A and 3B are timing charts of a load process in which authorized value is given to a loaded card.
Figure 3B:
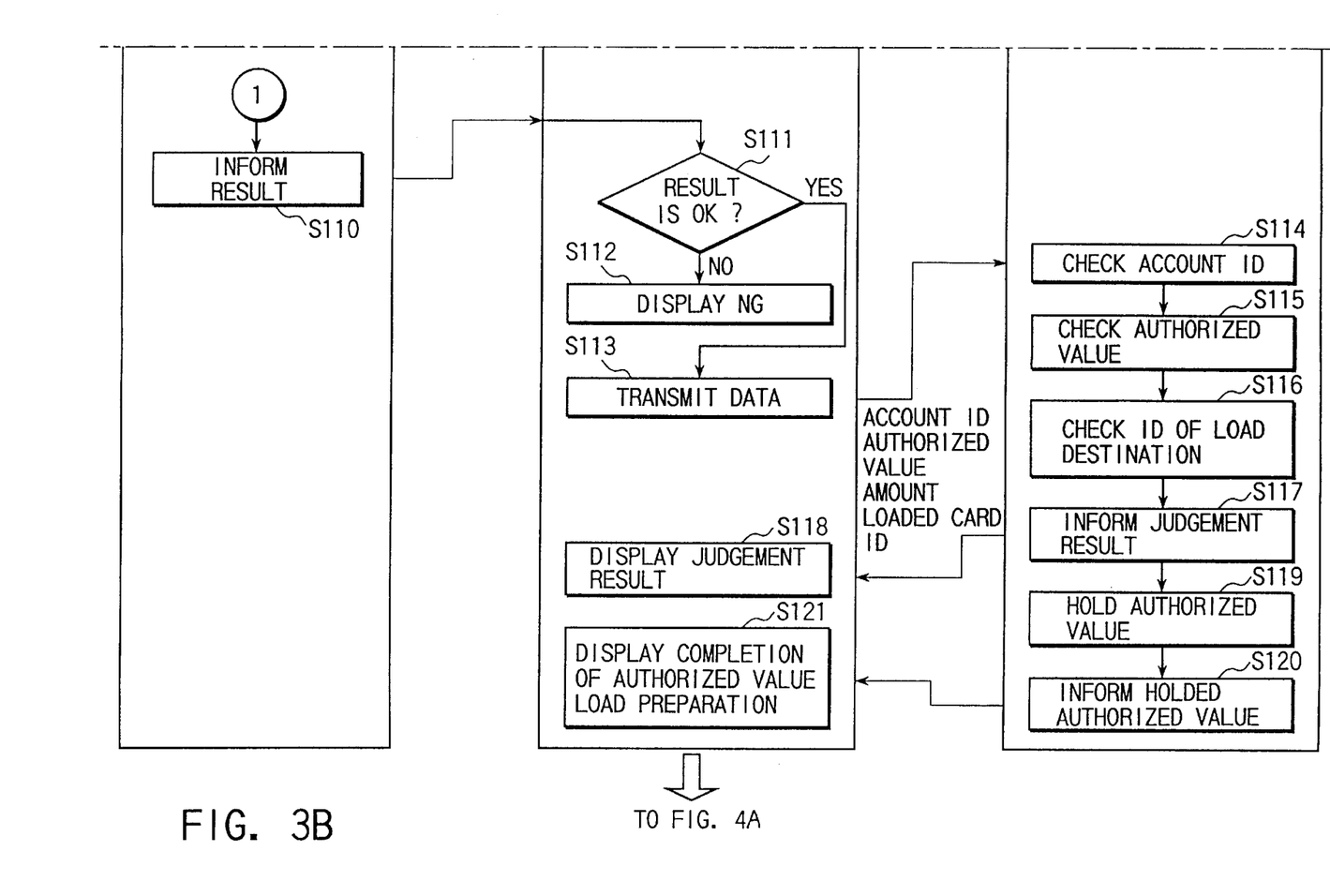
Figure 4A:
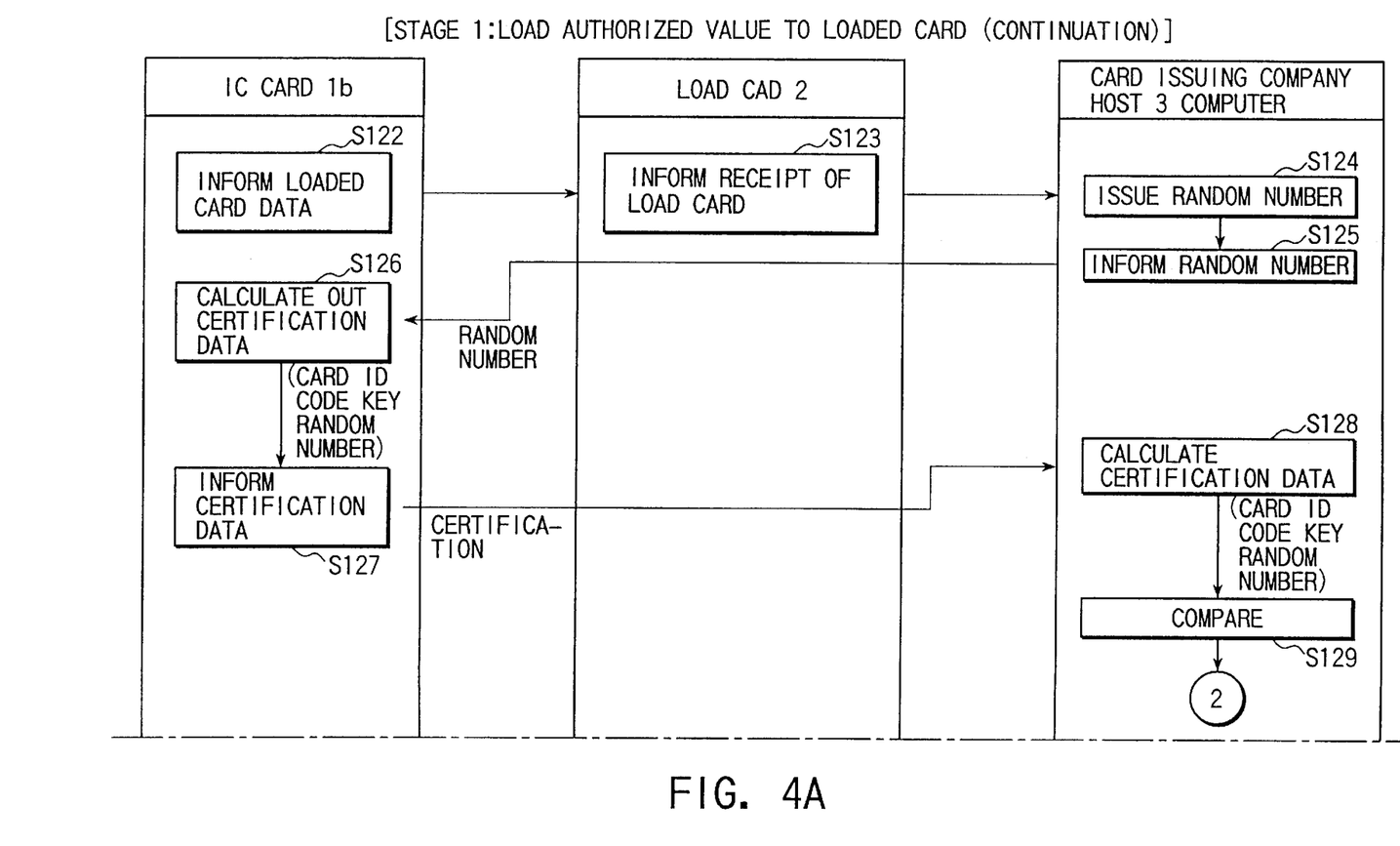
FIGS. 4A and 4B are timing charts of a load process in which authorized value is given to a loaded card.
Figure 4B:
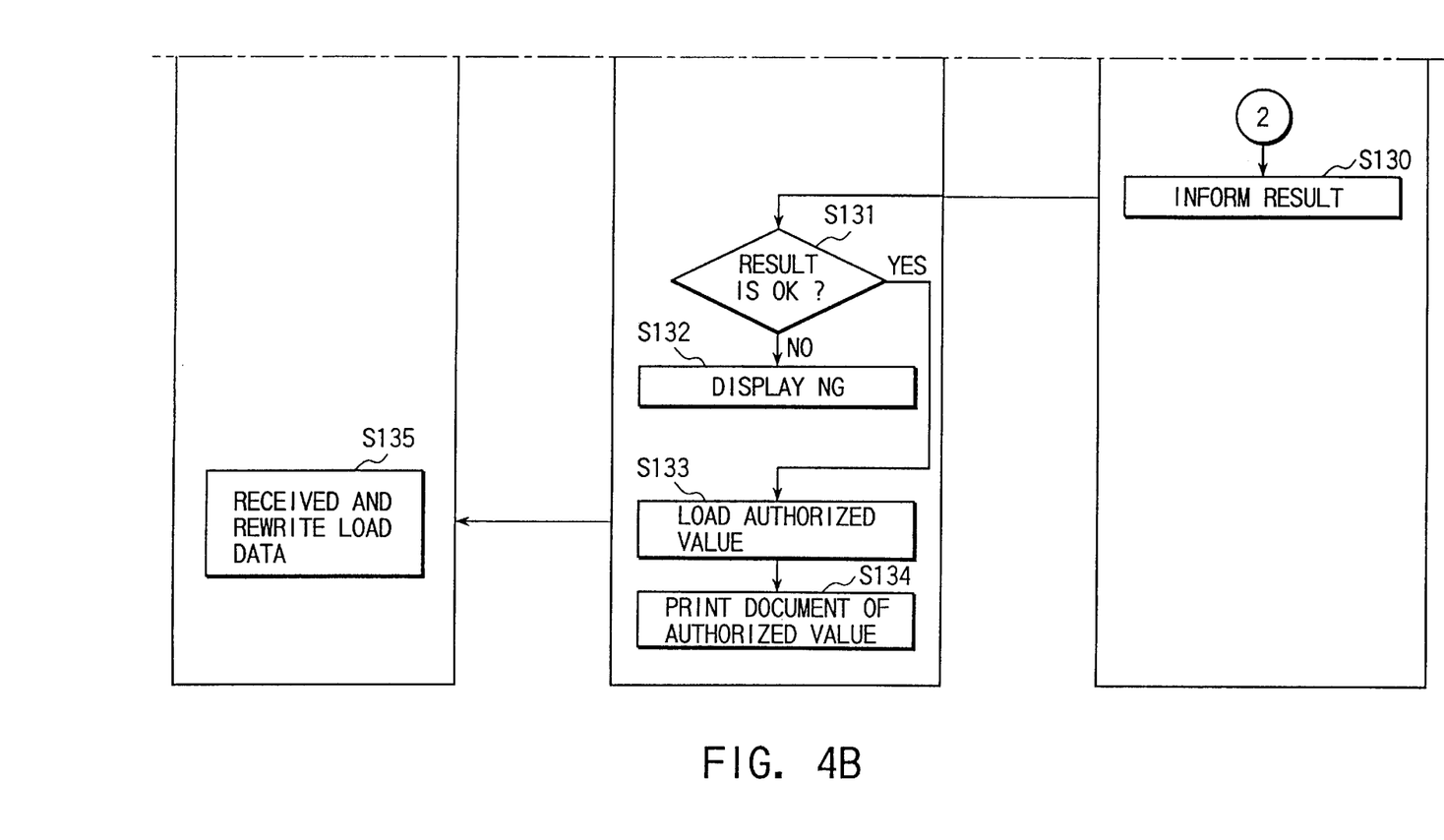

The process according to the present invention is mainly divided into the following stages. The stages will be described in timing charts shown in FIGS. 3A and 3B and following figures to be described later.

Stage 1 shown in (a) of FIG. 2: Supplementation of authorized value to Supplementation Card 1b In this process, the authorized value card (IC card) 1a to which authorized value can be given is used to instruct the authorized value to be loaded, and then the approved authorized value is loaded to the loaded card (a predetermined card) 1b.

Initially, the authorized value card 1a is inserted into the load CAD 2 so that authorized value is loaded to the authorized value card 1a. The load CAD 2 instructed to load the authorized value card 1a transmits, to the host computer 3 of the card issuing company, data in the authorized value card 1a and the amount of money to be loaded. The host computer 3 of the card issuing company, which has received data, confirms whether or not the instructed amount of money may be approved. If the approval may be performed, the authorized value is transmitted to the load CAD 2. The load CAD 2 transmits the authorized value to a predetermined loaded card 1b to load the loaded card 1b.

Stage 2 shown in (b) of FIG. 2: Transaction on Shop by using Supplementation Card 1b The loaded card 1b, to which the authorized value has been loaded, is used to perform transaction with the transaction CAD 5 provided for the shop (an actual shop or a virtual shop). After the transaction has been performed, the authorized value in the loaded card 1b is subtracted by the amount of the transaction. Then, data of the transaction is generated in the transaction CAD 5, and then temporarily stored (subjected to tanking).

Stage 3 shown in (c) of FIG. 2: Transmission of Data to Card Issuing Company

Data items of the transaction temporarily stored in each of the plural transaction CADs 5 are collectively transmitted (data items are captured) to the access points 4 at predetermined time. Each access point 4 assigns data of transaction to a predetermined host computer 3 of the card issuing company. The host computer 3 of the card issuing company, which has received data of the transaction, performs the demand process.

The operation for processing the IC card in the above-mentioned structure will now be described with reference to timing charts shown in FIGS. 3A to 6.

FIGS. 3A to 6 are timing charts showing the processes which are performed by the load CAD 2, the transaction CAD 5, the IC card 1, the access point 4 and the host computer 3 of the card issuing company in each stage.

FIGS. 3A to 4B are timing charts showing the authorized value loading process to the loaded card (the IC card) 1b in the stage 1. In this process, data is transmitted/received among the IC card (the authorized value card 1a and the loaded card 1b), the load CAD 2 and the host computer 3 of the card issuing company. If necessary, data may be encrypted by each of the data encrypting/decrypting sections 14, 29, 35, 45 and 59 of the respective devices so as to be transmitted. The device, which has received data, may decrypt data by each of the data encrypting/decrypting sections 14, 29, 35, 45 and 59, if necessary.

When the loaded card (the IC card) 1b has been inserted into the IC card reader/writer 2 of the load CAD 2, authorized value remainder of the loaded card 1b is informed from the loaded card 1b to the load CAD 2 (S101). The load CAD 2 acquires the authorized value remainder of the loaded card 1b to calculate a required load amount (S102). The loaded card 1b may calculate a required load amount to inform the same to the load CAD 2. If a load method is employed in which a predetermined amount of money is substituted regardless of the authorized value remainder in the loaded card 1b, steps 101 and 102 are not required.

When the authorized value card (the IC card) 1a has been inserted into the IC card reader/writer 27 of the load CAD 2, data of the authorized value card 1a is informed from the authorized value card 1a to the load CAD 2 (S103). The load CAD 2, to which data has been informed, receives the ID (account ID) of the authorized value card 1a from the authorized value card 1a and receives (one or plural) IDs of the loaded card 1b to which authorized value can be loaded from the authorized value card 1a (S104). If it is a card to which the authorized value has been permitted, also the transaction amount is informed at this time.

At this time, one or plural IDs of the loaded card 1b exist in transaction data. If a plurality of IDs exist, the load CAD 2 displays candidates of the load destination on the display unit 25 (S105) to receive the load destination input through the keyboard 26 (S106) (in a case where a plurality of load destinations exist).

Then, the PIN (Personal Identification Number) input through the keyboard 26 of the load CAD 2 is received (S107) and informed to the authorized value card 1a (S108). The authorized value card 1a, to which the PIN has been informed, compares the informed PIN with the PIN stored in the PIN storage 15 in the authorized value card 1a (S109) to inform the load CAD 2 of a result of the judgment (S110).

The load CAD 2, to which the result of the judgment has been informed, checks the result of the judgment (S111). If the judgment is not acceptable, a message indicating disapproval is displayed on the display unit 25 (S112) and the process is interrupted. If the judgment is approval, the account ID of the authorized value card 1a, the ID of the loaded card 1b and the authorized value amount are informed to the host computer 3 of the card issuing company (S113).

The host computer 3 of the card issuing company, to which informing has been performed, refers to the file 28 to check whether or not the account ID exists (S114). Then, the amount (the limitation amount) obtained by subtracting the utilization amount from the limitation amount of authorized value utilization stored in the file 28 is calculated so as to confirm whether or not the card has an amount larger than the informed authorized value amount. Thus, whether or not approval may be performed (S115) is checked. Moreover, whether or not the ID of the load destination is a valid ID is checked by making a reference to the file 28 (S116). After the above-mentioned checking processes have been completed, a result of judgment is informed to the load CAD 2 (S117). The load CAD 2, to which the judgment has been informed, displays the result of the judgment on the display unit 25 (S118).

After step S117 has been completed, the host computer 3 of the card issuing company holds the authorized value of the authorized value amount, that is, adds the amount, which is approved this time, to the amount of utilization in the file 34 (S119). The load CAD 2 receives information to inform the held authorized value to the load CAD 2 (S120), and then completion of preparation for the authorized value load is displayed on the display unit 25 (S121).

When the loaded card 1b is inserted into the IC card reader/writer 27 of the load CAD 2 after the preparation for the authorized value load has been completed, data of the loaded card is informed from the loaded card 1b to the load CAD 2 (S122). If one IC card 1 has both of the functions of the loaded card and the authorized value card, the above-mentioned step is not required. In this case, the process automatically proceeds from step S121 to step S123.

That is, receipt of the loaded card 1b is informed to the host computer 3 of the card issuing company (S123). The host computer 3 of the card issuing company, which has received information, issues a random number (S124), and then informs the loaded card 1b of the random number (S125). The loaded card 1b, to which the information has been supplied, calculates certification data in the data encrypting/decrypting section 14 in accordance with the ID of the loaded card, an encryption/decryption key in the data encrypting/decrypting section 14 and the informed random number (S126).

After the certification data has been calculated, the certification data is transmitted to the host computer 3 of the card issuing company (S127). Also the host computer 3 of the card issuing company, to which the certification data has been informed, calculates a certification data by the same method as that employed in the loaded card 1b (S128) so as to subject the certification data transmitted from the loaded card 1b and the certification data calculated by the host computer 3 of the card issuing company to a comparison to confirm whether or not the two certification data items are the same (S129).

An example of the process which is performed at this time will now be described.

The random number (for example, 3) generated in the host computer 3 is converted (for example, multiplied by 5) with a code (for example, 5) so that a certification data (for example, 15) in the host computer 3 is obtained. The above-mentioned random number (for example, 3) is, this time, supplied to the IC card so that similar conversion (for example, multiplication with 5) is performed in the IC card so that certification data of the card (for example, 15) is obtained. Finally, the certification data generated in the card is transferred to the host computer 3. In the host computer 3, confirmation is performed such that the certification data (15) generated in the host computer 3 and the transferred certification data (15) are the same so as to judge the present card is a valid card. Thus, certification of the card can be performed.

After the confirmation has been performed, a result of the judgment is informed to the load CAD 2 (S130). The load CAD 2, to which information has been supplied, determines the result of the judgment (S131). If the judgment is not acceptable, a message indicating disapproval is displayed on the display unit 25 (S132). If the judgment is approval, load of the authorized value, that is, rewriting of the remainder of authorized value in the memory 12 of the loaded card 1b is performed (S133). Then, the load CAD 2 outputs a document indicating completion load of the authorized value from the printer 24.

The IC card 1, to which the authorized value has been loaded from the load CAD 2, stores load data in the memory 12 (S134). As a result, the necessity for the host computer to perform the credit inquiry can be eliminated when transaction is performed in a range of the loaded amount of money.

Figure 5:
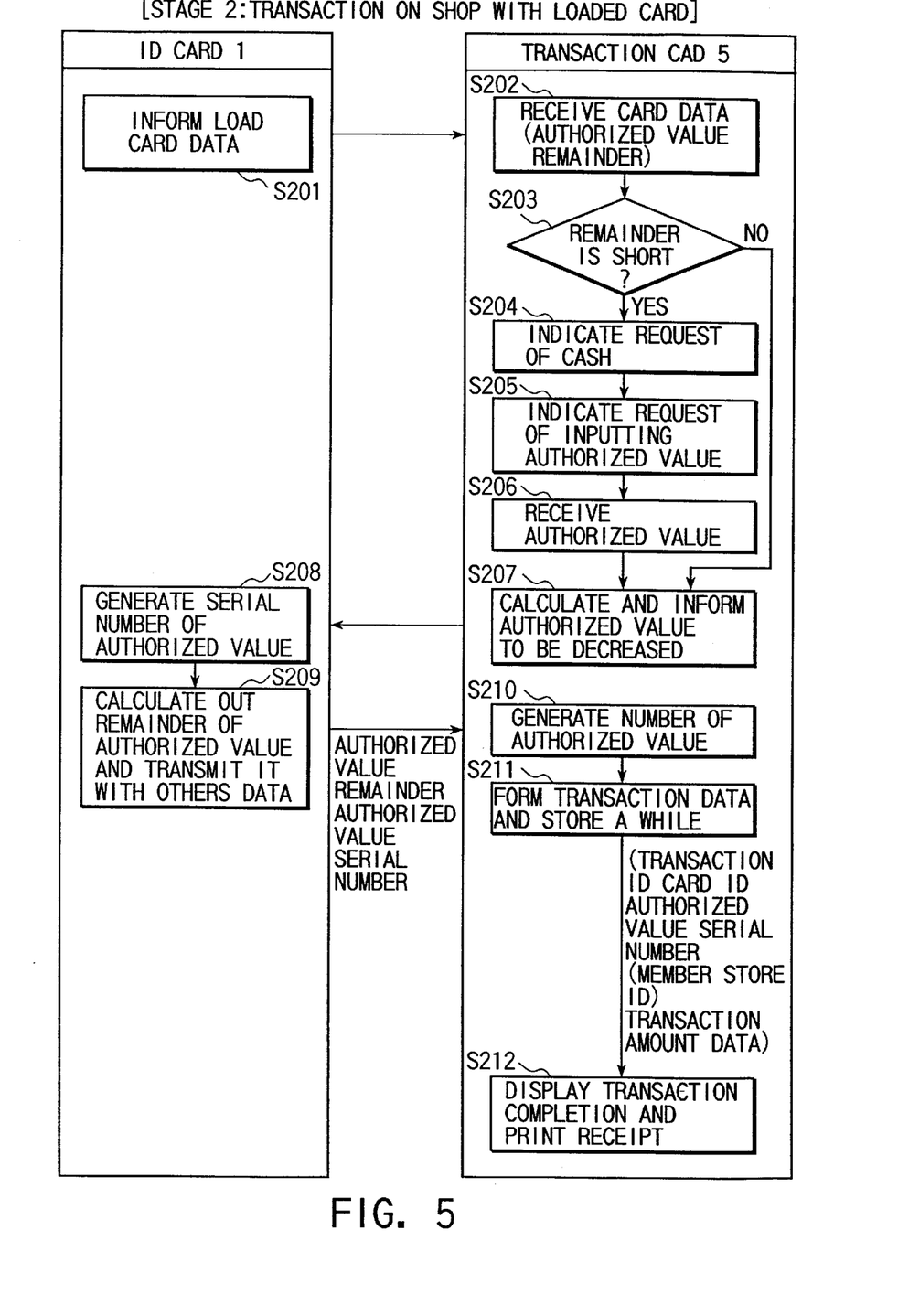
FIG. 5 is a timing chart of a transaction process which is performed on a shop by using the loaded card.

FIG. 5 is a timing chart of a transaction process which is performed on a shop by using a loaded card. In this process, data is transmitted/received between the IC card (the loaded card 1b) and the transaction CAD 5 so that the transaction process is performed.

When the cardholder (the owner) or a salesclerk inserts the loaded card 1b into the IC card reader/writer 57 of the transaction CAD 5 to pay the amount, the loaded card 1b informs data thereof (S201). Then, the transaction CAD 5 acquires the remainder of the authorized value in the loaded card 1b (S202).

The transaction CAD 5 checks the amount of the remainder (S203) to confirm whether or not the authorized value for the amount to be paid exists in the loaded card 1b. If no authorized value exists or the amount is in short, a message requiring cash is displayed on the display unit 55 (S204). If the amount is further in short, a requirement to input an amount which must be paid as an authorized value is performed (S205). Then, the amount which must be paid as the authorized value is received through the keyboard 56 (S206).

If a sufficiently large amount of authorized value exists or if the authorized value is in short and thus a portion of the amount is paid as the authorized value, the transaction CAD 5 calculates the authorized value amount which must be subtracted from the loaded card 1b to inform the amount to the loaded card 1b (S207). The loaded card 1b, to which the amount has been informed, issues a serial number to the serial number generating section 13 and makes the above-mentioned number as the serial number (S208). The authorized value remainder in the memory 12 is subtracted so that the latest authorized value remainder is obtained and the same is informed to the transaction CAD 5 (S209).

In the transaction CAD 5 to which the latest authorized value remainder has been informed, the transaction ID number generating section 60 issues the transaction ID (S210) to generate transaction data and temporarily store the transaction data (S211). Then, the transaction CAD 5 displays a message indicating completion of the transaction on the display unit 55 and issues a receipt from the printer 54.

Figure 6:
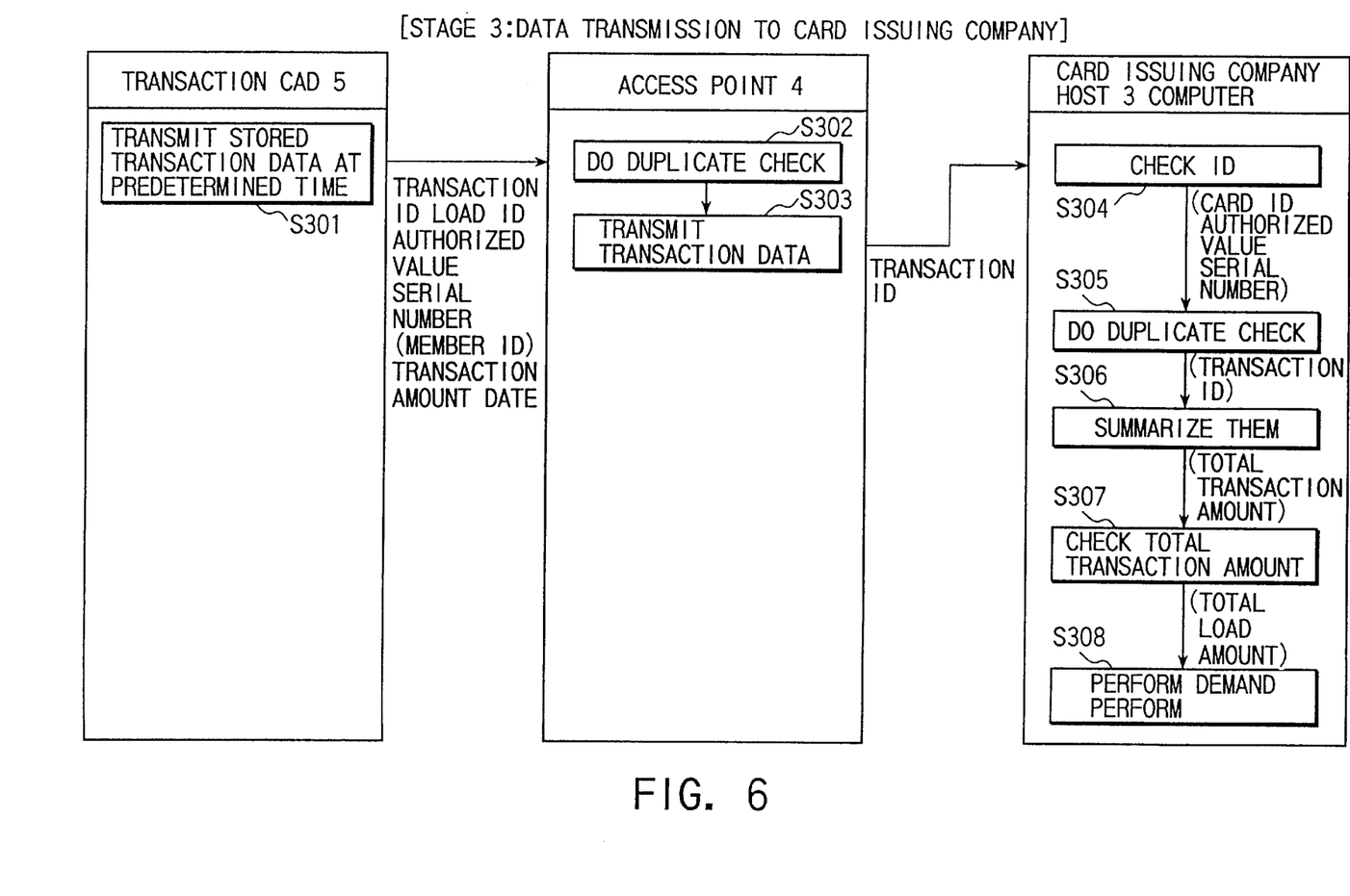
FIG. 6 is a timing chart of a process for transmitting data to a card issuing company.

FIG. 6 is a timing chart showing a data transmission process to the host computer 3 of the card issuing company in the stage 3. In this process, data is transmitted/received among the transaction CAD 5, the access point 4 and the host computer 3 of the card issuing company so as to perform the process. At predetermined time, the transaction CAD 5 transmits, to the access point 4, transaction data which has been stored temporarily (S301). The access point 4, which has received data, confirms whether or not the transaction ID in data is duplication of the transaction ID of received data stored in the file 44. Then, the access point 4 transfers the respective transaction IDs to the host computer 3 of the card issuing company (S302).

The host computer 3 of the card issuing company confirms whether or not the card ID in transaction data and the authorized value serial number are not duplication of received transaction data in the file 34 (S304) and whether or not the transaction ID is duplication of received transaction data in the file 34 (S305). Moreover, transaction data for each authorized value card ID (which can be judged from the loaded card ID) is totaled at predetermined time (S306) to confirm whether or not the total transaction amount exceeds the amount loaded as the authorized value (S307). Then, the amount which must be demanded is forwarded to the demand processing section 38. The demand processing section 38, which has received information, makes a demand to the owner (the cardholder) of the authorized value card 1a (S308).

Figure 7:
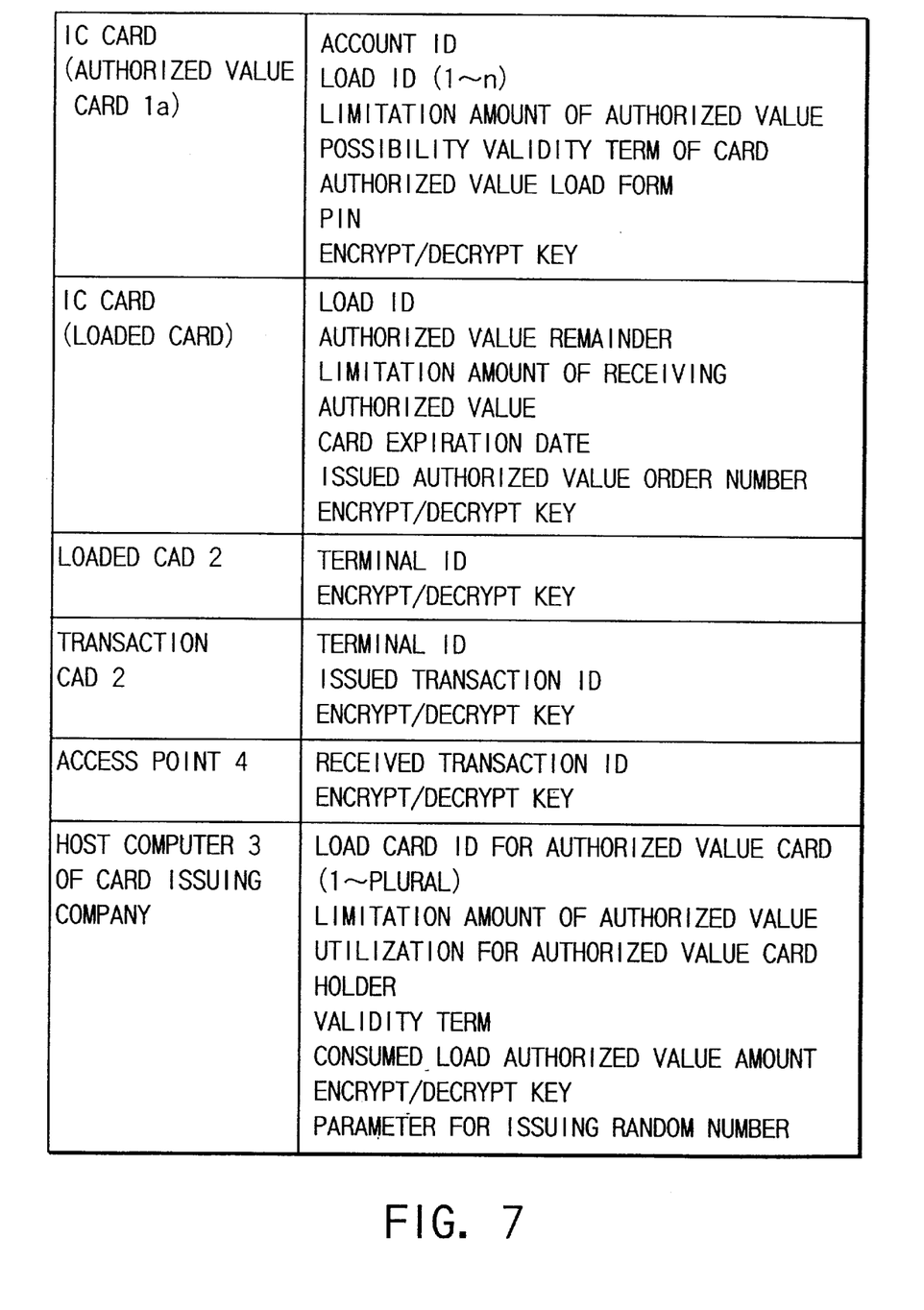
FIG. 7 is a diagram showing an example of data to be stored for the process of each unit.

FIG. 7 shows an example of data required in the above-mentioned process and stored in the IC card (the authorized value card 1a), the IC card (the loaded card 1b), the load CAD 2, the transaction CAD 5, the access point 4 and the host computer 3 of the card issuing company.

The IC card (the authorized value card 1a) has the account ID, the loaded card ID (1 to n), authorized value amount limit, card expiration date, form of the authorized value load, the PIN, the encryption/decryption key and the like. The loaded card ID (1 to n) and the authorized value load form are sometimes manually input. The authorized value load form is an amount addition method or an amount rewriting method.

The IC card (the loaded card 1b) has the loaded card ID, the authorized value remainder, the limitation amount of receiving authorized value, the validity term of authorized value, the issued authorized value order number and the encryption/decryption key.

The load CAD 2 has the terminal ID and the encryption/decryption key.

The transaction CAD 5 has the terminal ID and the encryption/decryption key.

The access point 4 has the received transaction ID and the encryption/decryption key.

The host computer 3 of the card issuing company has the loaded card ID (1 to plural) for the authorized value card, the limitation amount of authorized value for authorized value cardholder, the loaded authorized value amount, the card expiration date, the consumed load authorized value amount, the encryption/decryption key, the parameter for issuing random number.

As described above, according to this embodiment, the credit inquiry is collectively and previously performed so that the credit inquiry at each transaction is omitted. Therefore, the cost and time required to perform the credit inquiry can be eliminated.

As compared with the conventional credit process in which the credit inquiry has been performed whenever transaction is performed and the transaction takes the cost and time for performing the credit inquiry, collective approval enables the cost and time taken when transaction is performed to be reduced.

All of data items required to load authorized value to a card are stored in the card to enable automatic input so that authorized value is easily and simply loaded.

Since an instruction for approval and registration of approval data are synchronized using one card, registration of approval data can be performed easily with satisfactory excellent security.

A card, to which registration of approval data can be performed, is previously registered and whether or not the card is a registered card is confirmed and a validity of the card is confirmed so that registration of approval data relating an unlawful card or a card which is not adaptable for the system is prevented.

As described above, according to the present invention, there are provided the card transaction system capable of minimizing the cost required to perform the credit inquiry and improving the security and the card transaction method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A card transaction system which includes a first card medium, a first accepting apparatus for the first card medium, and a host computer of the first card medium issuer connected to the first accepting apparatus via a communication line, comprising:

approving means for causing the host computer to answer one credit inquiry from the issuer so that the host computer approves right of use for the first card medium within a predetermined amount of money without a necessity of performing a credit inquiry;

supply means for causing the first accepting apparatus to supply information of the right of use to the first card medium when the approving means approves the right of use;

storage causing means for causing information of the right of use to be stored in a storage region of the first card medium so as to realize a plurality of transactions with the first card medium within the predetermined range of the amount of money without the necessity of performing the credit inquiry;

a second card medium corresponding to an identifier previously registered in the first card medium and different from the second card medium;

means for causing the host computer to answer one credit inquiry from the issuer so that the host computer approves a right to supply the right of use from the first card medium to the second card medium; and means for causing the first accepting apparatus to supply the right of use to the second card medium corresponding to the answer from the host computer.

2. A card transaction system according to claim 1, wherein the approving means includes:

means for causing the first accepting apparatus to receive information of the amount of a remainder of a present right of use from the first card medium to calculate the required amount of money of the right of use and causing the host computer to approve the right of use of the amount of money.

3. A card transaction system according to claim 1, further comprising:

certifying means for causing the card medium to receive a first personal identification number input through the first accepting apparatus so as to subject the first personal identification number and a second personal identification number stored in a storage section to a comparison so as to perform personal certification; and means for informing the first accepting apparatus of a result of judgment of the certifying means that the first and second personal identification numbers are the same when the certifying means has judged that the first and second personal identification numbers are the same and interrupts the process when the certifying means has judged that the first and second personal identification numbers are not the same.

4. A card transaction system according to claim 1, wherein the storage causing means includes:
- a second accepting apparatus for transaction with the second card medium connected to the host computer via the communication line and arranged such that the second card medium is inserted thereto;
- means for causing the second accepting apparatus to receive information of the present amount of money of the right of use of the second card medium from the inserted second card medium so as to judge whether or not transaction required by a user can be performed in accordance with received information; and
- means for generating data of transaction in accordance with the contents of the transaction when the judging means has judged that the transaction can be performed.

5. A card transaction system according to claim 1, wherein the storage causing means includes:
- a second accepting apparatus for transaction with the second card medium connected to the host computer via the communication line and arranged such that the second card medium is inserted thereto;
- means for causing the second accepting apparatus to receive information of the present amount of money of the right of use of the second card medium from the inserted second card medium so as to judge whether or not transaction required by a user can be performed in accordance with received information;
- means for calculating the amount of money of the right of use which must be subtracted to supply an obtained amount of money to the second card medium when a judgment has been performed that the transaction can be performed; and
- means for causing the second card medium to receive the amount of money of the right of use which must be subtracted so as to calculate a present remainder of the right of use in accordance with the amount of the money of the right of use which must be subtracted.

6. A card transaction system which includes a first card medium, an accepting apparatus for the first card medium, and a host computer of the first card medium issuer connected to the accepting apparatus via a communication line, comprising:
- approving means for causing the host computer to answer one credit inquiry from the issuer so that the host computer approves right of use for the first card medium within a predetermined amount of money without a necessity of performing a credit inquiry;
- supply means for causing the accepting apparatus to supply information of the right of use to the first card medium when the approving means approves the right of use;
- causing means for causing information of the right of use to be stored in a storage region of the first card medium so as to realize a plurality of transactions with the first card medium within the predetermined range of the amount of money without the necessity of performing the credit inquiry;
- a second card medium corresponding to an identifier previously registered to the first card medium and arranged to be accepted by the accepting apparatus;
- means for causing the host computer to generate a random number to supply the random number to the second card medium;
- means for causing the second card medium to perform calculations to correspond to the supplied random number to generate first certification data so as to supply the first certification data to the host computer;
- means for causing the host computer to generate second certification data to correspond to the random number so as to generate second certification data; and
- means for causing the host computer to subject first certification data and second certification data to a comparison so as to cause the accepting apparatus to supply the right of use to the second card medium when first certification data and second certification data are the same.

7. A card transaction system which includes a first card medium, an accepting apparatus for the first card medium, and a host computer of the first card medium issuer connected to the accepting apparatus via a communication line, comprising:
- approving means for causing the host computer to answer one credit inquiry from the issuer so that the host computer approves right of use for the first card medium within a predetermined amount of money without a necessity of performing a credit inquiry;
- supply means for causing the accepting apparatus to supply information of the right of use to the first card medium when the approving means approves the right of use; and
- storage causing means for causing information of the right of use to be stored in a storage region of the first card medium so as to realize a plurality of transactions with the first card medium within the predetermined range of the amount of money without the necessity of performing the credit inquiry; wherein
the storage causing means includes:
- a second accepting apparatus for transaction with the second card medium connected to the host computer via the communication line and arranged such that the second card medium is inserted thereto;
- means for causing the second accepting apparatus to receive information of the present amount of money of the right of use of the second card medium from the inserted second card medium so as to judge whether or not transaction required by a user can be performed in accordance with received information;
- means for generating data of transaction in accordance with the contents of the transaction when the judging means has judged that the transaction can be performed;
- means for displaying a requirement for the user to pay cash when a judgment has been performed that the transaction cannot be performed; and
- means for performing display for causing payment with the amount of money of the right of use in addition to the cash when the cash is in short and receiving input of the amount of money.

8. A card medium processing method of a card transaction system which includes a first card medium, a first accepting apparatus for the first card medium, and a host computer of the first card medium issuer connected to the first accepting apparatus via a communication line, comprising:
- causing the host computer to answer one credit inquiry from the issuer so that the host computer approves right of use for the first card medium within a predetermined amount of money without a necessity of performing a credit inquiry;

causing the first accepting apparatus to supply information of the right of use to the first card medium when the right of use has been approved;

causing information of the right of use obtained from the supplying step to be stored in a storage region of the first card medium so as to realize a plurality of transactions with the first card medium within the predetermined range of the amount of money without the necessity of performing the credit inquiry;

causing the host computer to answer one credit inquiry from the issuer so that the host computer approves a right to supply the right of use from the first card medium to the second card medium; and causing the first accepting apparatus to supply the right of use to a second card medium corresponding to an identifier previously registered in the first card medium and different from the second card medium corresponding to the answer from the host computer.

9. A card medium processing method according to claim 8, wherein the approving step includes:

causing the first accepting apparatus to receive information of the amount of a remainder of a present right of use from the first card medium to calculate the required amount of money of the right of use and causing the host computer to approve the right of use of the amount of money.

10. A card medium processing method according to claim 8, further comprising the steps of:

certifying for causing the card medium to receive a first personal identification number input through the first accepting apparatus so as to subject the first personal identification number and a second personal identification number stored in a storage section to a comparison so as to perform personal certification; and informing the first accepting apparatus of a result of judgment in the certifying step that the first and second personal identification numbers are the same when the certifying means has judged that the first and second personal identification numbers are the same and interrupts the process when a judgment has been performed that the first and second personal identification numbers are not the same.

11. A card medium processing method according to claim 8, wherein the causing of information to be stored includes:

inserting the second card medium into a second accepting apparatus for transaction with the second card medium connected to the host computer via the communication line;

causing the second accepting apparatus to receive information of the present amount of money of the right of use of the second card medium from the inserted second card medium so as to judge whether or not transaction required by a user can be performed in accordance with received information; and generating data of transaction in accordance with the contents of the transaction when a judgment has been performed in the judgment step that the transaction can be performed.

12. A card medium processing method according to claim 8, wherein the causing of the information to be stored includes:

inserting the second card medium into a second accepting apparatus for transaction with the second card medium connected to the host computer via the communication line;

causing the second accepting apparatus to receive information of the present amount of money of the right of use of the second card medium from the inserted second card medium so as to judge whether or not transaction required by a user can be performed in accordance with received information;

calculating the amount of money of the right of use which must be subtracted to supply an obtained amount of money to the second card medium when a judgment has been performed that the transaction can be performed; and causing the second card medium to receive the amount of money of the right of use which must be subtracted so as to calculate a present remainder of the right of use in accordance with the amount of the money of the right of use which must be subtracted.

13. A card medium processing method of a card transaction system which includes a first card medium, an accepting apparatus for the first card medium, and a host computer of the first card medium issuer connected to the accepting apparatus via a communication line, comprising:

causing the host computer to answer one credit inquiry from the issuer so that the host computer approves right of use for the first card medium within a predetermined amount of money without a necessity of performing a credit inquiry;

causing the accepting apparatus to supply information of the right of use to the first card medium when the right of use has been approved;

causing information of the right of use obtained from the supplying step to be stored in a storage region of the first card medium so as to realize a plurality of transactions with the first card medium within the predetermined range of the amount of money without the necessity of performing the credit inquiry;

causing the host computer to generate a random number;

supplying, to the second card medium which is accepted by the accepting apparatus corresponding to identifiers previously registered to the first card medium, the random number;

causing the second card medium to perform calculations to correspond to the supplied random number to generate first certification data so as to supply the first certification data to the host computer;

causing the host computer to generate second certification data to correspond to the random number so as to venerate second certification data; and causing the host computer to subject first certification data and second certification data to a comparison so as to cause the accepting apparatus to supply the right of use to the second card medium when first certification data and second certification data are the same.

14. A card medium processing method of a card transaction system which includes a first card medium, an accepting apparatus for the first card medium, and a host computer of the first card medium issuer connected to the accepting apparatus via a communication line, comprising:

causing the host computer to answer one credit inquiry from the issuer so that the host computer approves right of use for the first card medium within a predetermined amount of money without a necessity of performing a credit inquiry;

causing the accepting apparatus to supply information of the right of use to the first card medium when the right of use has been approved; and causing information of the right of use obtained from the supplying step to be stored in a storage region of the first card medium so as to realize a plurality of transactions with the first card medium within the predetermined range of the amount of money without the necessity of performing the credit inquiry; wherein the causing of the information to be stored includes:

inserting the second card medium into a second accepting apparatus for transaction with the second card medium connected to the host computer via the communication line;

causing the second accepting apparatus to receive information of the present amount of money of the right of use of the second card medium from the inserted second card medium so as to judge whether or not transaction required by a user can be performed in accordance with received information;

generating data of transaction in accordance with the contents of the transaction when a judgment has been performed in the judgment step that the transaction can be performed;

displaying a requirement for the user to pay cash when a judgment has been performed that the transaction cannot be performed; and performing display for causing payment with the amount of money of the right of use in addition to the cash when the cash is in short and receiving input of the amount of money.

15. A card transaction system which includes a first card medium, a first accepting apparatus for the first card medium, and a host computer of the first card medium issuer connected to the first accepting apparatus via a communication line, comprising:

means for causing information of the right of use to be stored in a storage region of the first card medium so as to realized a plurality of transactions with the first card medium within the predetermined range of the amount of money without the necessity of performing the credit inquiry;

a second accepting apparatus for transaction with a second card medium connected to the host computer via the communication line and arranged such that the second card medium is inserted thereto;

means for causing the second accepting apparatus to receive information of the present amount of money of the right of use of the second card medium from the inserted second card medium so as to judge whether or not transaction required by a user can be performed in accordance with received information; and means for causing the host computer to perform a demand process after data of a transaction has been checked.

16. A card transaction system according to claim 15, wherein the storage causing means includes means for causing the second accepting apparatus to generate data of transaction including a transaction ID, a card ID, an authorized value serial number, an amount of the transaction and date in accordance with the contents of the transaction when the judgment means has judged that the transaction can be performed so as to temporarily store data of the transaction;

means for transferring stored data of transaction to the host computer at predetermined time; and means for checking whether or not the transaction ID, the card ID and the authorized value serial number in data of the transaction are duplicate of those of previous transactions.

17. A card medium processing method of a card transaction system which includes a first card medium, a first accepting apparatus for the first card medium, and a host computer of the first card medium issuer connected to the first accepting apparatus via a communication line, comprising:

causing information of the right of use obtained from the supplying step to be stored in a storage region of the first card medium so as to realized a plurality of transactions with the first card medium within the predetermined range of the amount of money without the necessity of performing the credit inquiry;

inserting a second card medium into a second accepting apparatus for transaction with the second card medium connected to the host computer via the communication line;

causing the second accepting apparatus to receive information of the present amount of money of the right of use of the second card medium from the inserted second card medium so as to judge whether or not transaction required by a user can be performed in accordance with received information; and causing the host computer to perform a demand process after data of a transaction has been check.

18. A card medium processing method according to claim 17, wherein the causing of the information to be stored includes:

causing the second accepting apparatus to generate data of transaction including a transaction ID, a card ID, an authorized value serial number, an amount of the transaction and date in accordance with the contents of the transaction when a judgment has been performed that the transaction can be performed so as to temporarily store data of the transaction;

transferring stored data of transaction to the host computer at predetermined time; and checking whether or not the transaction ID, the card ID and the authorized value serial number in data of the transaction are duplicate of those of previous transactions.

* * * * *